Oct. 7, 1958
S. J. JOHNSON ET AL
2,854,793
APPARATUS FOR BUTT WELDING GLASS CAPILLARY TUBES
Filed Oct. 27, 1954
7 Sheets-Sheet 1
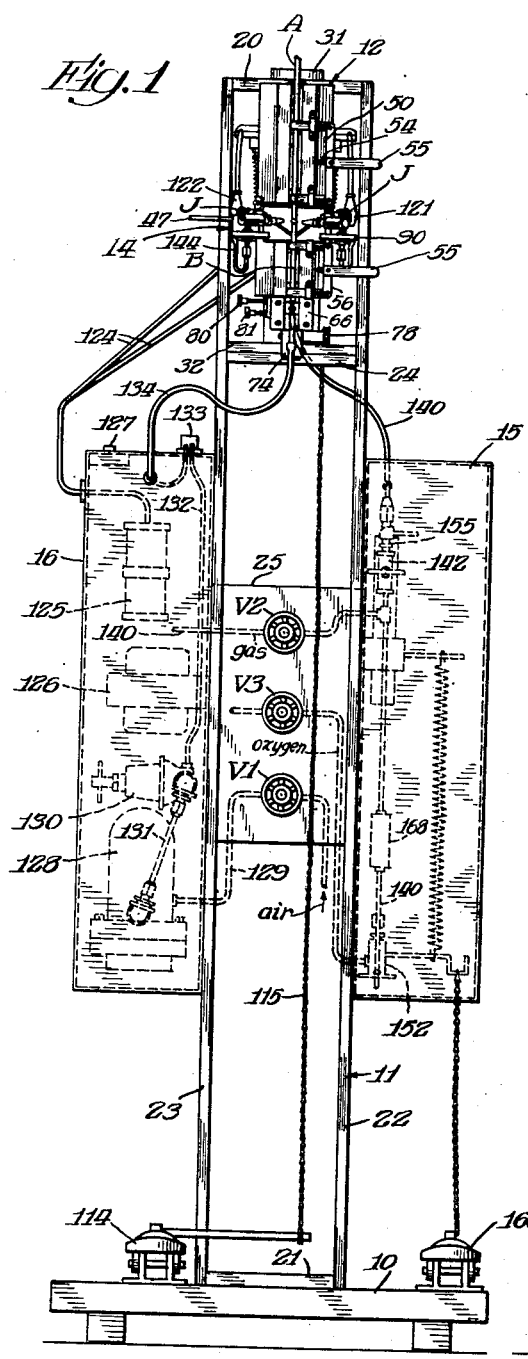
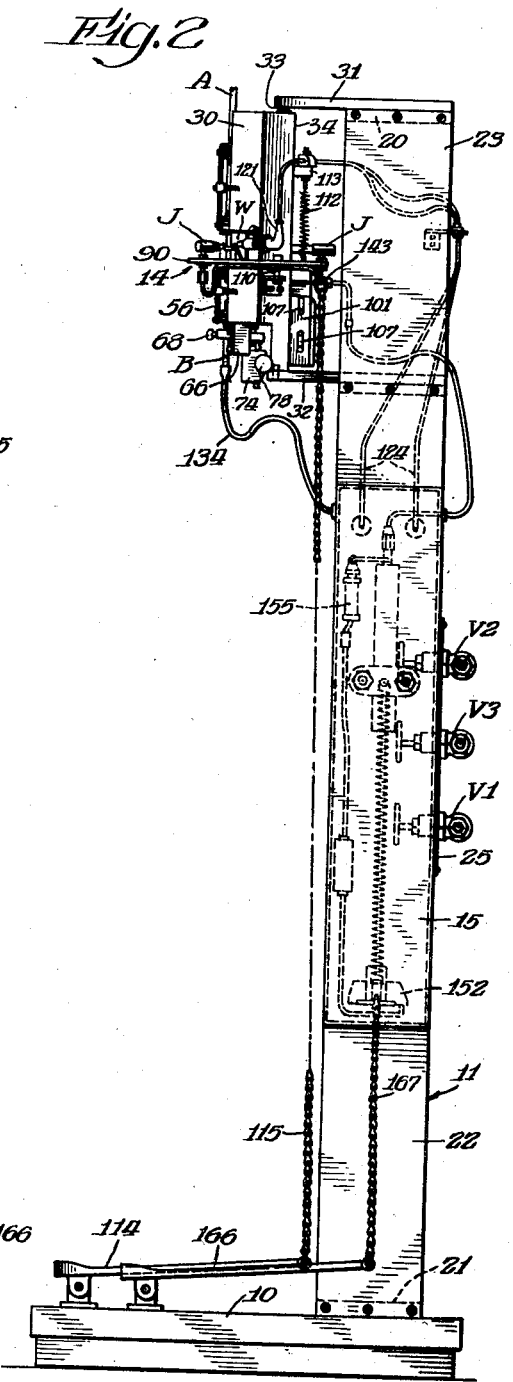
Inventors:
Sam J. Johnson
Don A. Brosseau
By Harvey M. Gillespie Atty.

Oct. 7, 1958  S. J. JOHNSON ET AL  2,854,793
APPARATUS FOR BUTT WELDING GLASS CAPILLARY TUBES
Filed Oct. 27, 1954  7 Sheets-Sheet 2
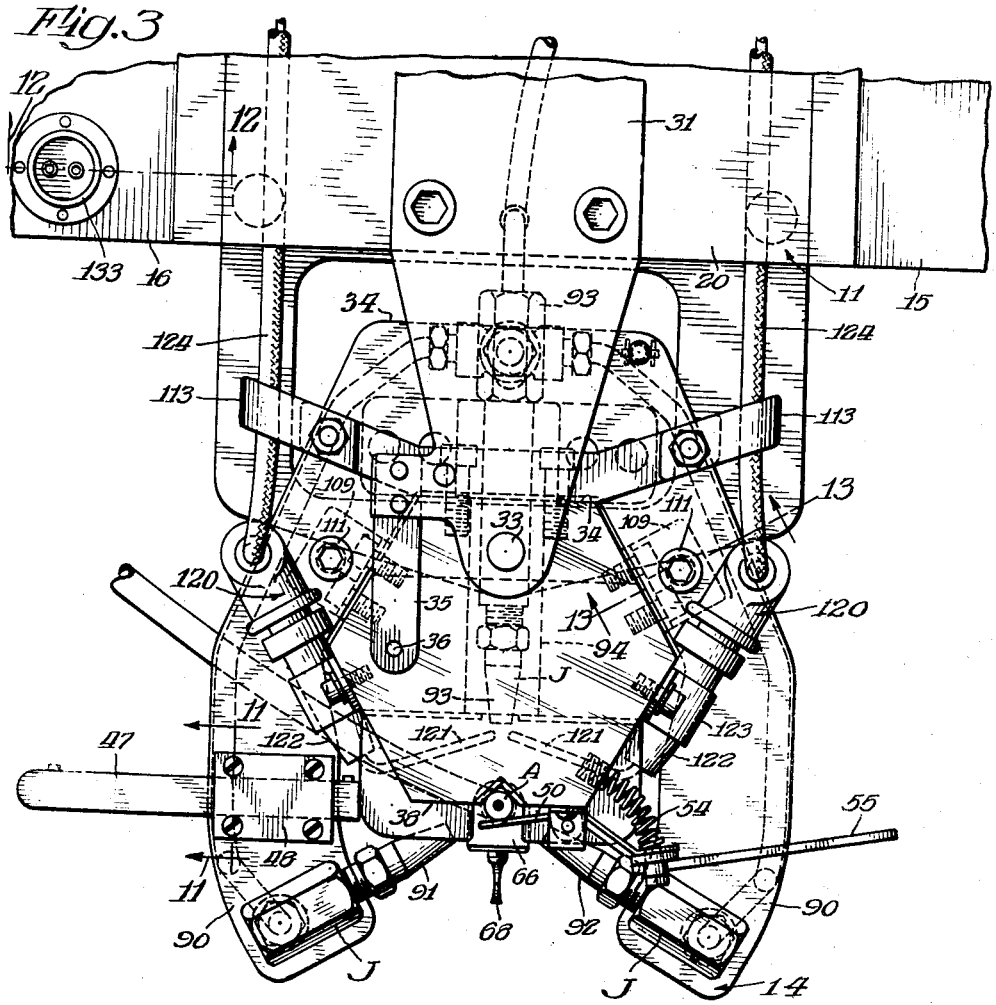
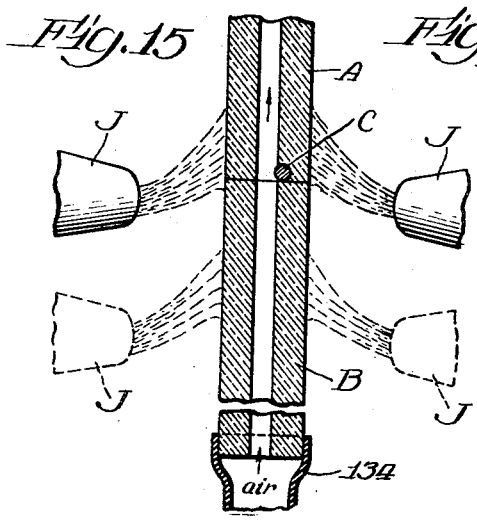
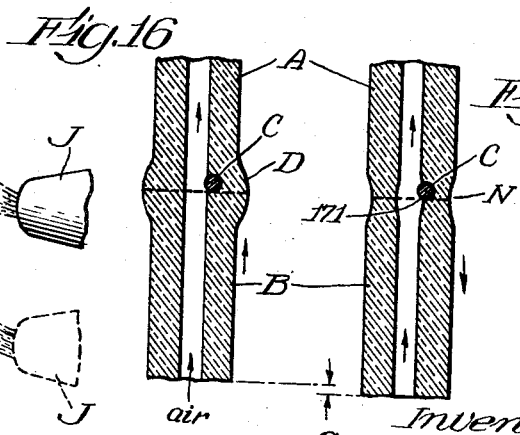
Inventors:
Sam J. Johnson
Don A. Brosseau
By Harver M. Gillespie Atty

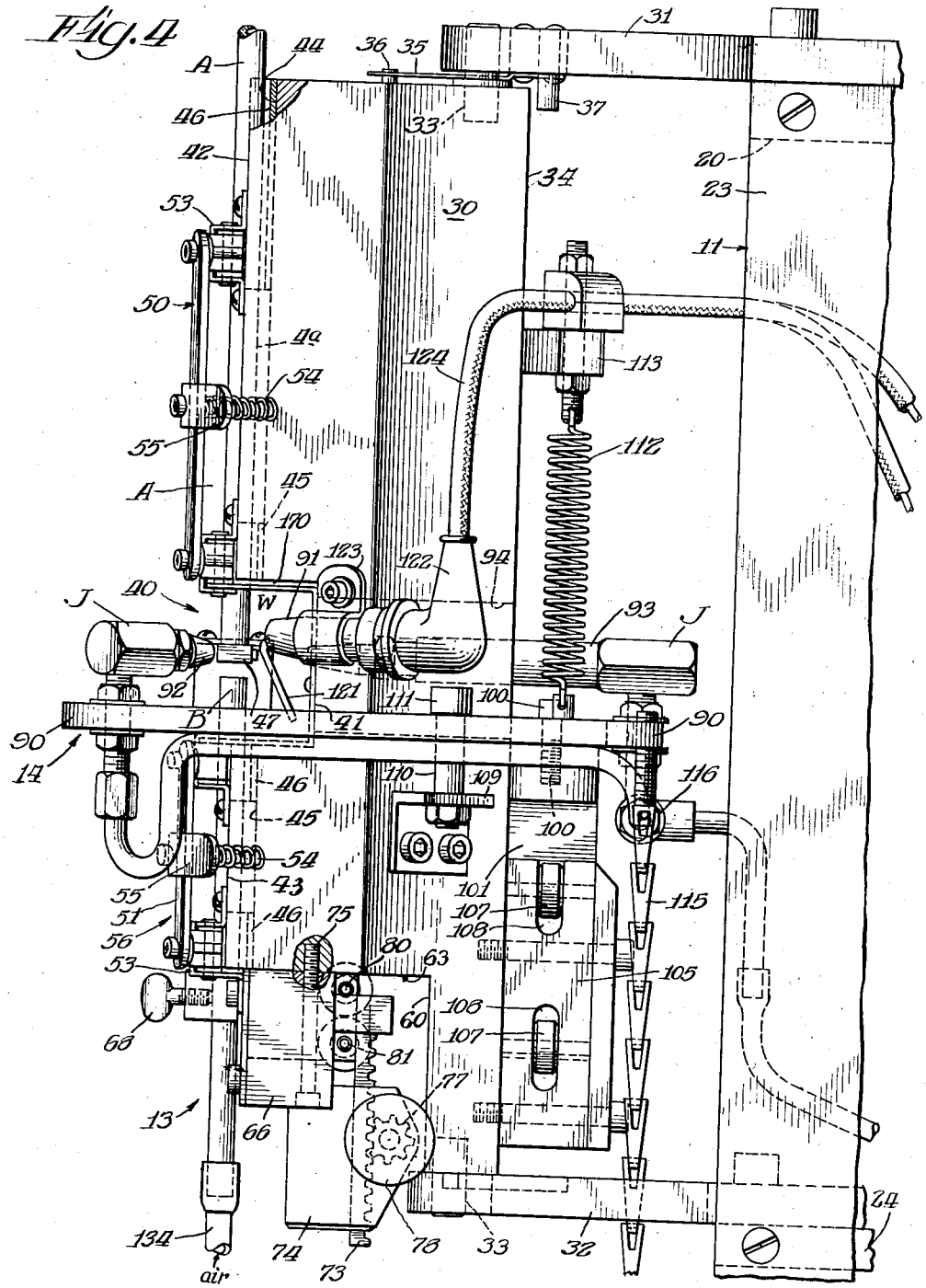

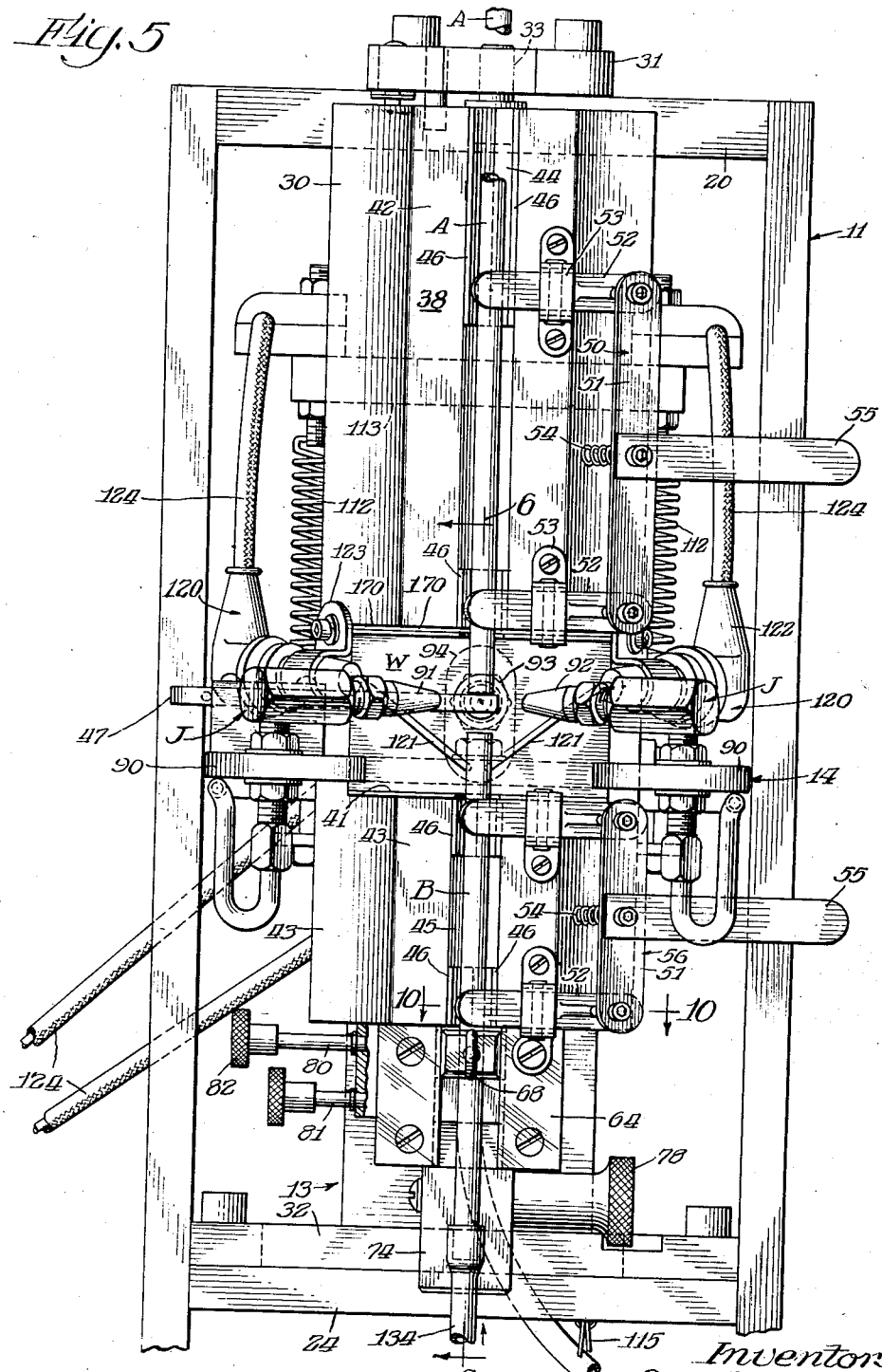

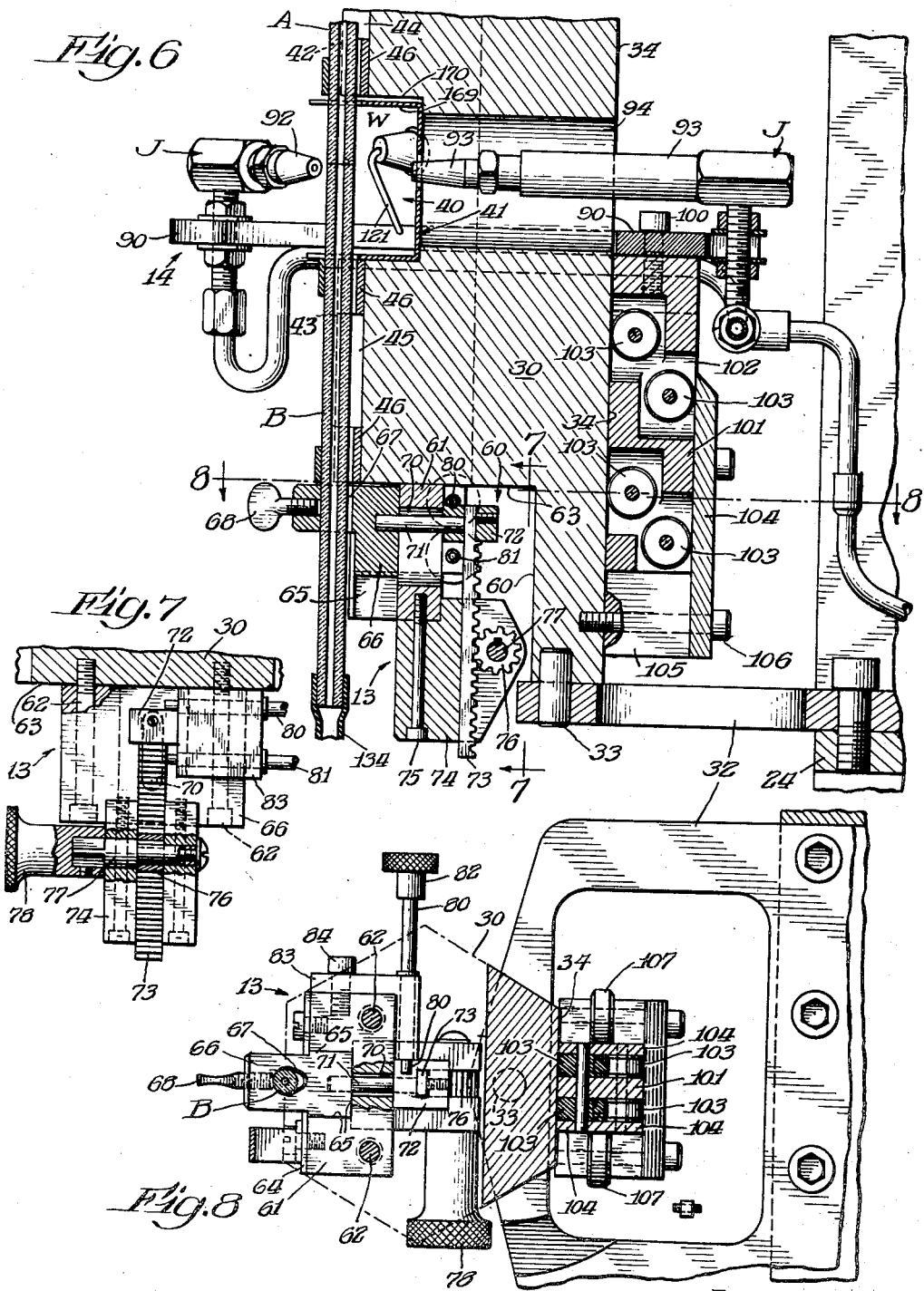

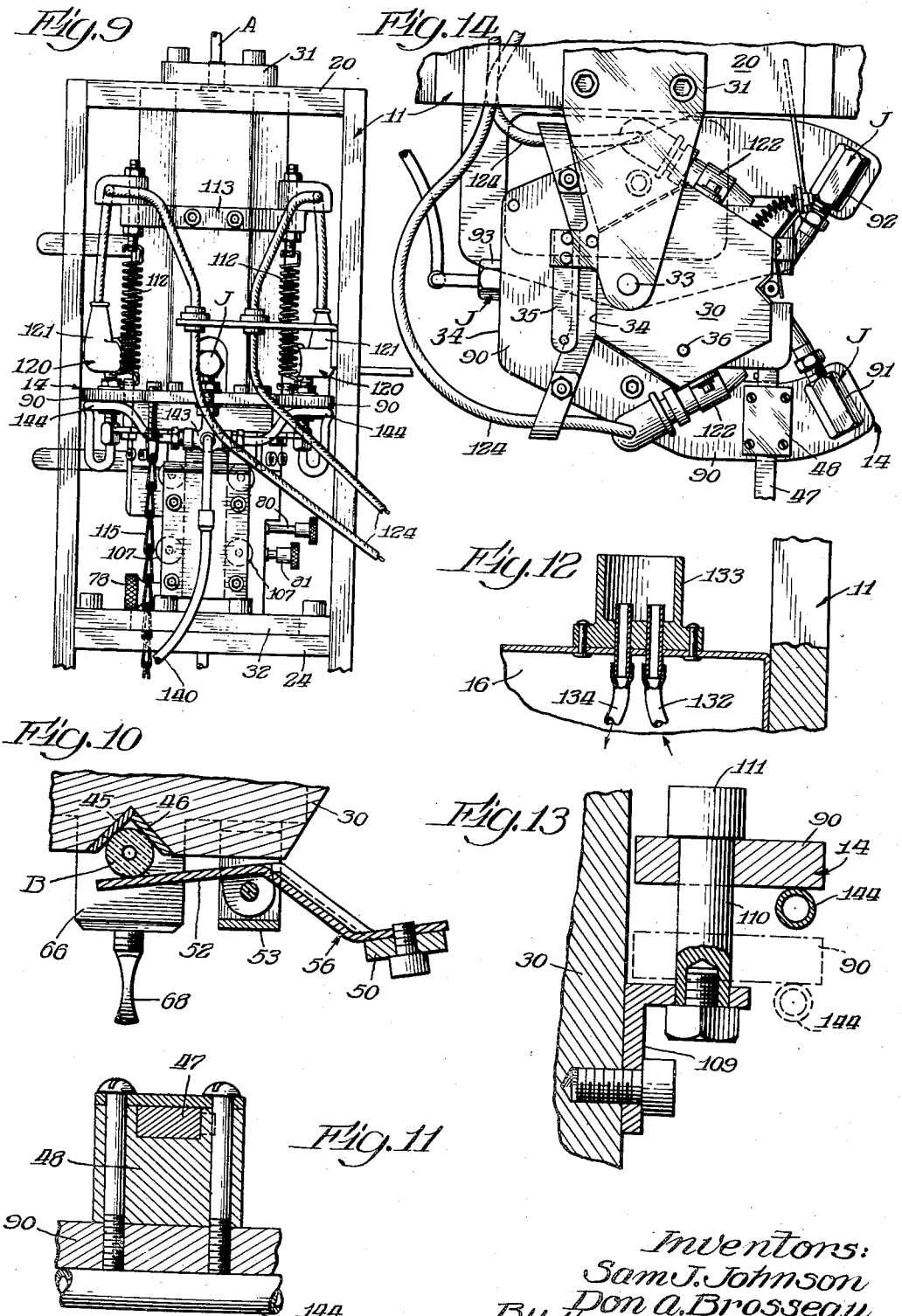

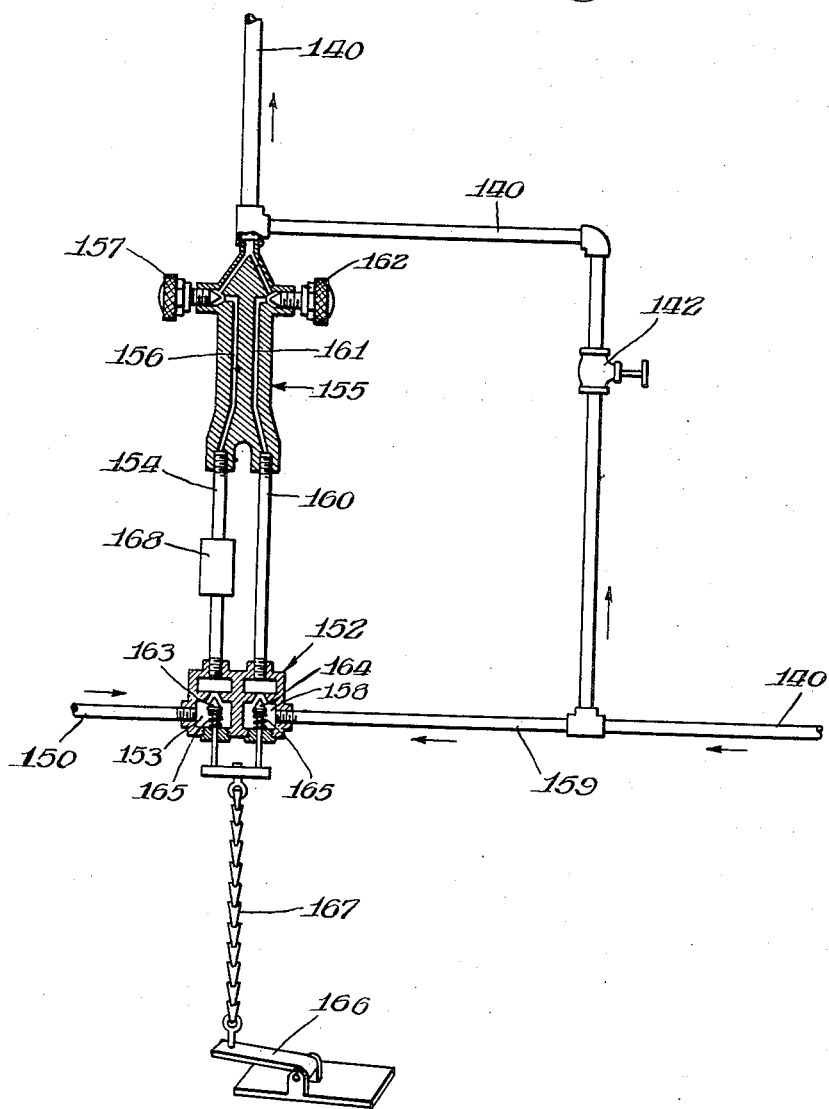

United States Patent Office 2,854,793
Patented Oct. 7, 1958

2,854,793

APPARATUS FOR BUTT WELDING GLASS CAPILLARY TUBES

Sam J. Johnson and Don A. Brosseau, Chicago, Ill., assignors to Vapor Heating Corporation, Chicago, Ill., a corporation of Delaware Application October 27, 1954, Serial No. 465,114

7 Claims. (Cl. 49—1)

The present invention relates to apparatus for butt welding the ends of glass tubes together so that the joined sections assume positions of perfect alignment. The invention has particular application in connection with the manufacture of liquid column thermostats according to the method set forth in Patent No. 2,660,005, dated November 24, 1953, for Method of Making Mercury Column Thermostats. According to this method, the glass tubing used in the manufacture of thermostats is severed at a desired location and a contact wire is embedded in one of the severed ends in chordal relation with respect to the central bore of the tubing. The severed ends are then butt welded together to form a single section of tubing, said method constituting a series of consecutive steps employed in the production of the liquid column thermostats.

Heretofore the process of fusing the severed ends of such glass tubing has been carried out utilizing a glass lathe wherein the tubing sections were positioned horizontally and rotated about their longitudinal axes both before and during the actual fusing operation. This process was extremely difficult to perform and involved various delicate operations requiring the employment of highly skilled trained operators, yet despite this, it resulted in a large percentage of spoilage wherein over 50% of the welded tubes were rejects. Many of the imperfections were attributable to lack of adequate provision for visual inspection for manual control purposes during the rotation and fusing operation and other imperfections were attributable to the inability of the operator to regulate certain compression and tensioning functions required for proper performance of a so-called necking operation employed in the process.

The present invention is designed to overcome the above-noted limitations that are attendant upon the manufacture of liquid column thermostats and, toward this end, it contemplates the provision of a semi-automatic apparatus wherein perfect alignment of the bores of the two tube sections undergoing welding is attained uniformly over any given period of time and with a negligible percentage of rejects. The provision of an apparatus of this character being among the principal objects of the invention, an equally important object is to provide an apparatus which is extremely simple to operate and by means of which an operator of average skill and intelligence may become proficient in its operation in a matter of one or two hours as compared to several weeks or months in the case of the glass lathe process briefly outlined above.

In carrying out the above broadly stated objects, the invention contemplates the provision of a novel form of tube clamping mechanism wherein the two tube sections to be joined are maintained in non-rotatable vertical alignment, together with means whereby one of the tube sections may be moved relative to the other during the actual butt welding and necking operations in a controlled manner so as to insure uniform welding and shaping operations on the successively joined pairs of tube sections. The invention further contemplates the controlled application of heat to the tube sections at various locations therealong, utilizing flame-producing jets for this purpose which are shiftable in the vicinity of the butt weld and which are capable of selectively producing moderate and intense flame characteristics for purposes of preheating the tube ends and of performing the actual butt welding and necking operations.

The provision of a tube welding apparatus of the character briefly outlined above being among the principal objects of the invention, numerous other objects and advantages thereof will become more readily apparent as the nature of the invention is better understood.

In the accompanying drawings forming a part of this specification a preferred embodiment of the invention has been shown.

In these drawings:

Fig. 1 is a front elevational view of a glass tube welding machine constructed in accordance with the principles of the invention.

Fig. 2 is a side elevational view of the machine of Fig. 1.

Fig. 3 is an enlarged fragmentary top plan view of the machine.

Fig. 4 is an enlarged fragmentary side elevational view of the upper portion of the machine in the vicinity of the tube clamping and manipulating instrumentalities.

Fig. 5 is a side elevational view of the structure shown in Fig. 4.

Fig. 6 is a sectional view taken substantially along the line 6—6 of Fig. 5.

Fig. 7 is a sectional view taken substantially along the line 7—7 of Fig. 6.

Fig. 8 is a sectional view taken substantially along the line 8—8 of Fig. 6.

Fig. 9 is a rear elevational view of the structure shown in Fig. 5.

Fig. 10 is a sectional view taken substantially along the line 10—10 of Fig. 5.

Fig. 11 is a sectional view taken substantially along the line 11—11 of Fig. 3.

Fig. 12 is a sectional view taken substantially along the line 12—12 of Fig. 3.

Fig. 13 is a sectional view taken substantially along the line 13—13 of Fig. 3.

Fig. 14 is a plan view similar to Fig. 3, but on a smaller scale and showing parts thereof moved 90° from the position shown in Fig. 3.

Figs. 15, 16 and 17 are fragmentary views, schematic in their representation, illustrating certain flame carriage and tube clamping mechanism movements that are resorted to in the operation of the machine, and Fig. 18 is a fragmentary fuel flow diagram illustrating the manner in which certain selective fuel-directing operations of which the machine is capable may be performed.

Referring now to the drawings in detail, in Figs. 15, 16 and 17 the method of uniting two glass sections by means of the present apparatus is schematically illustrated. In Fig. 15 the upper and lower glass tube sections A and B represent the two sections of a whole length of glass tubing that has been served transversely at a location wherein a contact wire C is to be inserted, and the wire is introduced in the section A by an embedding operation as described in said previously mentioned patent, utilizing the heat generated by the passage of electric current through the wire to soften the glass so that the wire may be placed within the tube in chordal relation with respect to the tube bore at or near the bore opening. The other section B is then positioned in end-to-end abutting relation with the tube A with the two tubes and their bores in accurate alignment. With the tubes thus positioned, a series of inwardly directed flame jets of moderate intensity are applied to the adjacent ends of the tubes in the vicinity where the butt weld is to be made, utilizing a gradual shifting movement of the jet nozzles J vertically to more evenly distribute the heat. After the tube ends have been thus initially preheated, a more intense flame is created by the jets J and the flames are applied directly to the butt weld location, and after these ends have been heated to welding temperature, the lower tube B is moved upwardly a predetermined distance while the upper tube A is maintained stationary so that by an upsetting operation the glass in the vicinity of the weld is caused to flow outwardly to create the bulge indicated at D in Fig. 16. Inward bulging of the glass within the bore of the joined tube sections is prevented by the passage of a stream of air upwardly through the bore, the stream being introduced from a suitable length of flexible tubing connected to the lower end of the tube section B. After the glass of the two tube sections A and B has become thoroughly united to form an homogenous mass, the tube section B is moved downwardly a predetermined distance in the performance of the necking operation so that a reduced throat or neck exists at N as shown in Fig. 17. The flow of air is continued through the thus joined tubing sections during the necking operation and for a short time thereafter until the integral tube has cooled sufficiently to permit its removal from the machine.

As will become apparent presently, the apparatus of the present invention is capable of effectively performing the above described operations upon glass tubing with precision and under controlled temperature conditions in such a manner that, for a given size of tubing, uniform travel of the lower tube section B upwardly during the butt welding operation and downwardly during the necking operation will be attained to produce unitary tube sections which are uniform within very fine tolerances.

*General description*

Referring now to Figs. 1 and 2 wherein the complete assembly of the tube welding machine is illustrated, the machine involves in its general organization a base platform 10 from which there extends upwardly a supporting framework. Adjacent the upper end of the frame, a tube-supporting or clamping mechanism 12 is supported. This mechanism which includes a tube-supporting and alignment block (see also Figs. 4 and 5) has formed therein upper and lower tube aligning grooves, separated by a relief area which constitutes a welding location or region W. Means are provided for fixedly clamping the upper tube section A in a selected position within the upper alignment groove and for slidably clamping the lower tube section B in the lower alignment groove. A vertically movable tube positioning block forming part of a manually operable tube positioning mechanism 13 is clamped to the lower tube section and is capable of vertical adjustment to cause the lower tube to be moved axially toward and away from the upper tube during performance of the butt welding and necking operations respectively.

The machine further includes a jet carriage mechanism 14, operable under the control of a foot pedal, wherein a series of inwardly directed flame-producing jets, mounted on a carriage proper, are vertically shiftable in unison in the vicinity of the welding location W for applying the preheating and the welding flames to the ends of the tubes A and B undergoing joining.

Finally, the machine includes certain control mechanism 15 suitably disposed in a pair of cabinets on opposite sides of the framework 11 and capable of operation under the control of a foot pedal for producing at will the moderate or soft flame required at the jets for preheating the tubing and the more intense welding flame required for the welding operation. The control mechanism further includes manual means whereby the amount of air passed through the tubing bore during the butt welding and necking operations may be regulated.

*The machine framework*

As shown in Figs. 1 and 2, the machine framework 11 is in the form of an elongated open rectangular box-like structure including top and bottom members 20 and 21, and upright side members 22 and 23. The bottom member 21 is suitably bolted to the platform 10. A shelf 24 extends horizontally between the side members 22 and 23 in the upper regions thereof and serves to support thereon a portion of the tube clamping mechanism 12. A rear plate 25 (Fig. 2) secured to the members 22 and 23 completes the basic machine framework on which the various operative machine instrumentalities are mounted.

*The tube clamping mechanism*

Referring now to Figs. 1 to 6 inclusive the tube clamping mechanism 12 includes an elongated, vertically disposed, horizontally swingable, tube clamping and aligning block 30 which is preferably, but not necessarily, hexagonal in horizontal cross section. The block 30 is mounted for horizontal swinging movement between a pair of supporting plates 31 and 32 (Fig. 4) which overhang the top frame member 20 and shelf 24 respectively. The said mounting includes trunnions 33 which are located at eccentric aligned positions near the rear face 34 (Fig. 3) of the hexagonal block 30. Normally, the block 30 is maintained in a fixed frontal position immediately forward of the framework structure 11 as shown in Fig. 3 by means of a releasable spring latch arm 35 carried by the plate 31 and which cooperates with a latch pin 36 projecting upward from the top hexagonal surface of the block. Upon manual release of the latch mechanism 35, 36, the block may be swung through approximately 90° to the position shown in Fig. 14 wherein the rear face of the block engages a limit stop 37 (see also Fig. 4) depending from the plate 31. Such swinging movement of the block 30 is provided for the purpose of permitting visual inspection of the glass tubing, which is clamped to the front face 38 of the block as will be described subsequently, from various angles for tube aligning purposes.

As best seen in Figs. 4, 5 and 6, the block 30 is formed with a rectilinear cut-out or relief portion in the form of a wide transverse intermediate recess 40 which provides the welding zone W and the walls of which are lined as at 41 to protect the block surfaces from the heat of the welding flame supplied by the previously mentioned jets J.

As shown in Figs. 4, 5 and 6, the slot 40 serves to divide the front face 38 of the block 30 into upper and lower alignment faces 42 and 43, the face 42 being formed with a centrally located vertical tube-receiving groove 44 and the face 43 being formed with a similar tube-receiving slot 45. The grooves 44 and 45 are V-shaped in cross section and are provided with suitable liners 46. The two slots 44 and 45 exist in accurate vertical alignment and the upper slot is adapted to receive therein one of the tube sections A to be welded while the lower slot is adapted to receive its counterpart tube section B. A normally retracted slide 47 (see Figs. 3, 4, 5 and 14) is movable from its retracted position shown in Fig. 3 to the position shown in Fig. 5 to provide a support for the lower end of the tube section A and to determine the position of such lower end of the tube relative to the jets J.

The upper tube section A is adapted to be firmly clamped in position within the groove 44 by means of a clamping mechanism 50 (Fig. 5) in the form of a yoke 51 having parallel yoke arms 52 pivoted in brackets 53 secured to the upper front face 42 of the block 30 and spring pressed as at 54 so that the spaced arms 52 bear inwardly against the tube A near the upper and lower ends thereof to maintain the tube in position against vertical shifting within the groove 44. A manual operating lever 55 permits manipulation of the clamping mechanism 50 for tube releasing purposes. The lower tube section B is adapted to be clamped in position within the groove 45 by means of a clamping mechanism 56 similar to the mechanism 50, and whose parts are similarly designated.

*The manually operable tube positioning mechanism*

The manually operable tube positioning mechanism 13 is best illustrated in Figs. 4 to 8 inclusive and is designed for the purpose of effecting vertical movements of the lower tube section B toward and away from the upper tube section A by a sliding action wherein the tube section B may be forced upwardly in the groove 44 relative to the tube section A, despite the clamping action of the mechanism 56, to effect the butt welding operation, and downwardly in the said groove to effect the necking operation. The clamping mechanism is situated within a rectangular recess 60 formed at the lower end of the block 30 (Fig. 6) and includes a block 61 secured by studs 62 to the underneath face 63 of the recess 60. The block 61 is U-shaped in horizontal cross-section and the forward surfaces thereof have retaining plates 64 (Fig. 8) secured thereto thus providing a vertical guideway 65 in which there is slidable a clamping block proper 66 having a vertical bore 67 formed therein through which the tube B is inserted prior to location thereof within the guide groove 45. A wing screw 68 serves to releasably clamp the tube B in position within the block 66 in a selected position. The fixed block 61 is slotted as at 70 and a drive pin 71 extends into the clamping block 66 and through the slot 70 and into a stop member 72 carried at the upper end of a vertically movable rack 73 which is slidable in a block 74 secured by studs 75 to the block 61. The rack 73 meshes with a pinion 76 mounted on a shaft 77 having a manually operable adjusting knob 78 associated therewith by means of which the height of the rack 73, and consequently of the clamping block 66 and tube B carried thereby, may be regulated.

The rack 73 is movable between upper and lower positions the elevations of which are determined by means of an upper retractable limit stop member or pin 80 and a fixed lower limit stop member 81 designed for engagement with the stop member 72 at the upper end of the rack 73. The pin 80 is carried on a manually accessible plunger 82 slidable in a block 83 secured by studs 84 to the block 61.

As will be described when the operation of the machine is set forth, manipulation of the control knob 78 will serve to move the clamping block 66 and rod B carried thereby vertically as desired to perform the butt welding and necking operation on the tubing undergoing joining.

*The jet carriage and operating mechanism therefor*

Referring now to Figs. 3, 4, 5 and 6, the jet carriage mechanism 14 includes a carriage proper in the form of a vertically reciprocable jet-supporting platform 90 of horseshoe configuration which partially surrounds the hexagonal block 30 and which is capable of limited vertical movement in the vicinity of the welding location W. The three previously mentioned jet devices J are suitably supported slightly above the level of the platform 90 and the jet nozzles 91 and 92 of two of the jets are supported near the ends of the U-shaped platform and are arranged to direct their flame jets rearwardly and inwardly toward the axis of the tubing undergoing joining at angles which are approximately 120° apart. The third jet nozzle 93 is of elongated design and extends through a slot 94 (Figs. 4 and 5) formed in block 30 and directs its flame jet forwardly at an angle of 120° from the other flame jets.

The carriage or platform 90 is mounted for limited vertical reciprocation relative to the block 30 and, toward this end, it is secured by studs 100 (Figs. 4 and 6) to a guide block 101 in the form of a cage having recesses 102 formed therein in which there are pivoted a series of Teflon covered rollers 103 including inner rollers whose horizontal axes extend transversely of the machine framework and which bear against the rear face 34 of the hexagonal block 30 as shown in Fig. 6. The series of rollers 103 also include similarly oriented outer rollers which bear against the inner face of a guide plate 104 which is spaced from the face 34 by a spacer block 105. Anchoring studs 106 secure the spacer block and plate in position. The platform 90 is thus guided in its vertical movements against fore and aft shifting. Sidewise shifting movement of the platform 90 is prevented by means of two pairs of Teflon covered rollers 107 (Figs. 4 and 8) mounted in slots 108 provided in the sides of the spacer blocks 105.

Referring now to Figs. 3 and 4, a pair of brackets 109 are secured to the block 30 on opposite sides thereof and carry vertically extending guide pins 110 having hexagonal heads 111 which constitute limit stops for determining the upper limit of travel of the platform 90. The brackets 109 themselves constitute lower limit stops for the platform.

The platform 90 is normally biased toward its uppermost position by means of a pair of relatively heavy coil springs 112 (Figs. 4, 5 and 9) suitably suspended from brackets 113 mounted on the block 30. The movements of the carriage are controlled by means of a foot treadle 114 (Fig. 1) mounted on the base platform 10 and which is operatively connected through a chain 115 and adjustment mechanism 116 to the rear portion of the platform 90.

*The control instrumentalities for the machine*

Included among the control instrumentalities for the machine is an ignition system comprising a pair of electrode assemblies 120 (Figs. 4 and 5) including electrodes 121 and dielectric holders 122 therefor which are mounted in brackets 123 attached to the side faces of the hexagonal block 30. The electrodes 121 are positioned so as to generate a flame igniting arc at a location along the lower glass tube B which is in register with the various jet nozzles 91, 92 and 93 when the platform 90 is in its lowermost position. The electrode assemblies 120 are connected through wires 124 in a conventional ignition circuit including an ignition coil 125, transformer 126 and starting button 127 mounted in the cabinet 16.

Also mounted within the cabinet 16 are an air filter 128 connected through an air line 129 having an air valve V1 interposed therein to a source of compressed air (not shown) an air pressure regulating valve 130 connected through an air line 131 to the filter and through a line 132 to a bleed cup 133 (see also Fig. 12) mounted at the top of the cabinet 16. The bleed cup 133 is connected through a flexible line 134 to the lower end of the tube section B (Figs. 4, 5, and 6) undergoing welding.

In order to produce a soft non-welding flame at the various jet nozzles to accomplish the preheating function, means are provided for supplying commercial gas to the jet assemblies J. Accordingly, a gas supply line 140 leads to a shut-off valve V2 mounted on the plate 25 (Fig. 2) and enters the cabinet 15 and has interposed therein a control valve 142 from whence the line extends to a three-way connection 143 which communicates through branch lines 144 to the various jet assemblies J.

For the production of an intense welding flame at the various jet nozzles, means are provided for supplying a mixture of oxygen and air to the three-way connection 143 for distribution to the various jet assemblies. Toward this end, an oxygen line 150 extends to a shut-off valve V3 mounted on the plate 25 and enters the cabinet 15 and is connected to the oxygen side of a dual oxygen and air welding flame control valve 152 (Figs. 1, 2 and 18). The valve 152 as shown in Fig. 18 has a valve chamber 153 for the passage of oxygen which is connected through a line 154 to a dual proportioning valve 155 having a passage 156 therethrough for the flow of oxygen; the passage being regulated by a valve 157. The valve 152 also has a valve chamber 158 for the passage of gas issuing from a line 159 connected to the gas supply line 140. The chamber 158 is connected through a line 160 to passage 161 formed in the dual proportioning valve 155 and the flow of gas through the passage is controlled by a valve 162. The two passages 156 and 161 discharge into the line 140 leading to the distribution valve 143.

The chambers 153 and 158 of the valve 152 communicate with their respective lines 154 and 160 through valve ports which are normally maintained closed by means of respective valve elements 163 and 164, spring pressed as at 165. The valve elements 163 and 164 are capable of opening and closing movements in unison under the control of a foot treadle 166 (see also Fig. 18) which is operatively connected to the valve by means of a chain 167. An expansion cylinder 168 is interposed in the line 154 leading to the proportioning valve 155 to prevent sudden surges of the fluid media conducted to the various jet nozzles.

The operation of the machine

In the operation of the machine the two tube sections A and B to be united are positioned in the respective grooves 44 and 45 provided for them in the forward face 38 of the hexagonal block 30. The upper tube A is securely held in position within the groove 44 by the clamping fingers 52. The lower tube B with the air tubing 134 applied thereto is passed through the opening 67 in the clamping block 66 as it is brought into an approximate position within the slot 45 behind the spring fingers 52 wherein the upper end thereof is in close proximity to the lower end of the tube A. Accurate alignment of the tubes axially is an automatic function of the machine since the two grooves 44 and 45 are in perfect alignment. However, circumferential alignment of the tubes must be attained so that the white opaque column background will present a continuous appearance in the finished thermostat assembly. Such circumferential alignment is facilitated by both a frontal and a side inspection of the aligned tubes. The side inspection may be made by releasing the latch mechanism 35, 36 as previously described and swinging the block 30 to the position shown in Fig. 14. After the tubes have been aligned and brought to a position of end to end abutment, the wing nut 68 of the clamping mechanism is tightened and the two tubes are thus held firmly in such alignment.

After alignment of the tubes with their abutting ends in the vicinity of the welding location W, the gas valves V2 and 142 are opened and the foot treadle 114 is depressed so as to lower the jet carrying platform 90 and bring the various jet nozzles below the level of the tube separation. In the lowered position of the platform the nozzles are in register with the electrodes 122 so that upon depression of the button 127 a moderate flame is produced at the various jet nozzles. By gradually raising and lowering the treadle 114 this moderate flame may be directed along the adjacent ends of the tubes A and B to preheat the same prior to the actual welding operation. The block 30 is protected from the heat of the flames by means of a shield plate 169 secured to the block 30 within the relief portion W to provide an air circulation space 170 (Figs. 4, 5 and 6) between the shield 169 and the block 30.

After the ends of the tubes A and B have been sufficiently preheated, the foot treadle 166 is depressed to open both the oxygen and gas sections of the dual flame control valve 152 so that a mixture of these gases is conducted to the various jet nozzles to produce an intense welding flame. The valve 142 is closed and the treadle 114 is released to permit the platform 90 to assume its elevated position under the influence of the springs 112 wherein the nozzles are positioned so as to direct an intense welding flame in the immediate vicinity of the tube separation.

To perform the actual welding operation when the glass has attained a welding temperature as ascertained by a color inspection, the control knob 78 is manipulated so as to raise rack 73 and clamping block 66 upwardly, thus carrying the lower tube B upwardly by a sliding action in the groove 45 to compress the molten glass and thereby create a bulge as illustrated in Fig. 16 and to allow the glass of both sections to become thoroughly united. The treadle 166 is then released to extinguish the flame and the residual gaseous mixture contained in the expansion tank 168 prevents a sharp shutting off of the flame with its attendant objectionable sharp audible report. The knob 78 is rotated in the opposite direction to lower the clamping block 66 and create the restriction or neck as shown in Fig. 17.

During the butt welding and the necking operations as previously described, the operator will regulate the amount of air passing upwardly through the tubes being fused. This regulation of air is obtained by placing a finger over the mouth of the bleed cup 133 and regulatably allowing air to escape to the atmosphere while forcing a portion of the air issuing from the line 132 to enter the tube 134 for conduction to the bore of the aligned tube sections A and B. The amount of air supplied to the tubes is covered by a visual determination of the consistency of the glass in the vicinity of the weld. During the necking operation the downward movement of the tube section B relative to the tube section A results in displacing the glass along both the inner and outer surfaces of the tube thereby providing a slight enlargement of the bore as indicated at 171 adjacent the contact electrode C.

From the above disclosure it will be seen that we have devised an improved machine in which the glass tube sections to be fused together are non-rotatably supported in longitudinal alignment, but the tube supporting block 30 of the machine can be readily and conveniently moved to various positions to permit visual inspection of the alignment of the said sections of glass tubing. It will also be noted that the provision of the upper and lower limit stops 80 and 81 respectively determine the normal upper and lower limits of movement of the clamping block and thereby, to a certain extent, removes the exercise of judgment on the part of the operator as to the extent of movement during the necking operation. However, the upper stop 80 is retractable so as to permit the lower section B of the tube to be placed upwardly a distance sufficient to form the circular bulge D (Fig. 16), but the lower fixed stop 81 determines the exact extent of the necking operation.

While we have described our improved apparatus in connection with certain preferred embodiments it will be obvious to persons familiar with the art that various changes in structure might be made without departing from the spirit of the invention. Therefore, it should be understood that the invention includes all such changes in structure as will come within the scope of the appended claims.

We claim:

1. A machine for butt welding together adjacent ends of two axially aligned glass tubes comprising, in combination, a machine framework, a clamping block pivotally mounted for swinging movement about a vertical axis in said framework between two extreme positions, said clamping block having a vertical front face divided by an intermediate recess into upper and lower surfaces, there being a vertically disposed tube-receiving groove in each of said surfaces with the two grooves being in axial alignment and in communication with said intermediate recess whereby the tubes may be positioned in the respective grooves in axial alignment with their adjacent ends abutting each other in the vicinity of the said intermediate recess and are moveable with said clamping block duirng its swinging movement, means for clamping said tubes, thus positioned, within their respective grooves means for releasably holding the block so that said grooved surfaces thereof are maintained in a frontal position, and means for projecting a plurality of jet flames into said intermediate recess and against the abutting ends of said glass tubes to heat them to a fusing temperature.

2. A machine for butt welding together adjacent ends of two axially aligned glass tubes as defined in claim 1 characterized in that said clamping means each comprises a yoke pivoted to one of said surfaces of the block and having spaced clamping fingers adapted to releasably bear against its respective glass tube to clamp the same within one of the grooves, and means normally biasing said yokes into clamping position.

3. A machine for butt welding together adjacent ends of two axially aligned glass tubes comprising, in combination, a machine framework, a clamping block pivotally mounted for swinging movement about a vertical axis in said framework between two extreme positions, said clamping block having a vertical front face divided by an intermediate recess into upper and lower surfaces, there being a vertically disposed tube-receiving groove in each of said surfaces with the two grooves being in axial alignment and in communication with said recess whereby the tubes may be positioned in the respective grooves in alignment with their adjacent ends abutting each other in the vicinity of said recess, means for directing a plurality of jet flames against the tubes in the region of their abutting ends to heat the said ends to a fusing temperature releasable clamping means adapted to bear against the tube in the upper groove with a degree of pressure sufficient to prevent axial shifting of the tube in the groove under the influence of predetermined force tending to produce such shifting, releasable clamping means adapted to bear against the tube in the lower groove with a lesser degree of force which is insufficient to prevent shifting of the tube within the groove when such predetermined force is applied to the tube, additional clamping means engageable with the tube in the lower groove for holding said tube in its abutting position relative to the other tube, means for bodily shifting said latter clamping means vertically to alter the position of the tube clamped thereby, and means for releasably holding the block in one of said extreme positions.

4. A machine for welding together adjacent ends of two axially aligned glass tubes comprising, in combination, a clamping block having a vertical front face divided into upper and lower surfaces by means of an intermediate recess defining a welding zone, there being a vertically disposed tube-receiving groove in each of said surfaces with the two grooves being in axial alignment and in communication with said recess whereby the tubes may be positioned in the respective grooves in alignment with their adjacent ends abutting each other preparatory to a welding operation, means for releasably clamping each of said tubes, thus positioned, within their respective grooves, a plurality of nozzles arranged radially of said tubes for projecting jet flames into said welding zone to heat the abutting ends of said tubes to a fusing temperature, positioning mechanism releasably engageable with one of said tubes and movable bodily vertically for moving said latter tube axially toward and away from the other tube against the action of said releasable clamping means during application of said flames to the tubes, and adjusting means for controlling the position of said tube positioning means.

5. A machine for welding together adjacent ends of two axially aligned glass tubes as defined in claim 4 characterized by the provision of upper and lower limit stop abutments positioned in the path of movement of said tube positioning means and engageable therewith to limit the movement thereof in either direction during one phase of the welding operation, and further characterized in that one of said limit stop abutments is retractable out of the path of movement of said positioning means to release the same for movement, during another phase of the welding operation, beyond its limit of vertical movement in one direction.

6. A machine for welding together adjacent ends of two axially aligned glass tubes comprising, in combination, a clamping block having a vertical front face divided into upper and lower surfaces by a recess defining a welding zone, there being a vertically disposed tube-receiving groove in each of said surfaces with the two grooves being in axial alignment and in communication with the recess whereby the tubes may be positioned in the respective grooves in alignment with their adjacent ends abutting each other preparatory to a welding operation thereon in the vicinity of said welding zone, means for releasably clamping each of said tubes, thus positioned, within their respective grooves in said block, jet nozzles for applying a welding flame to the abutting ends of the tubes at the welding zone, positioning means releasably engageable with one of the tubes and movable bodily vertically for moving said latter tube axially toward and away from the other tube against the action of its associated clamping means during the application of the welding flame to the tubes, and manually controlled means for passing a stream of air through the aligned tubes during the application of the welding flame thereto.

7. A machine for welding together adjacent ends of two axially lined glass tubes as defined in claim 6 characterized by the provision of a platform on which said nozzles are mounted, means for imparting reciprocating movements to the platform to move the nozzles lengthwise of the tubes, and means for supplying gaseous fuel to said nozzles for applying a moderate preheating flame to said tubes during said reciprocating movements of the platform.

References Cited in the file of this patent
UNITED STATES PATENTS

| | | |
|---|---|---|
| 766,321 | Burrows | Aug. 2, 1904 |
| 1,004,072 | Pierson | Sept. 26, 1911 |
| 1,832,039 | Millar | Nov. 17, 1931 |
| 2,296,347 | Hinkley et al. | Sept. 22, 1942 |
| 2,447,569 | Eisler | Aug. 24, 1948 |
| 2,488,126 | Kahle | Nov. 15, 1949 |

UNITED STATES PATENT OFFICE
CERTIFICATE OF CORRECTION

Patent No. 2,854,793

October 7, 1958

Sam J. Johnson et al.

It is hereby certified that error appears in the printed specification of the above numbered patent requiring correction and that the said Letters Patent should read as corrected below.

Column 2, line 64, for "served" read -- severed --; column 7, line 29, for "suddent" read -- sudden --; column 9, line 11, after "grooves" insert a comma.

Signed and sealed this 23rd day of December 1958.

(SEAL)

Attest:

KARL H. AXLINE
Attesting Officer

ROBERT C. WATSON
Commissioner of Patents